United States Patent
Liu et al.

(10) Patent No.: US 9,763,196 B2
(45) Date of Patent: Sep. 12, 2017

(54) MOBILE HOTSPOT UFI DEVICE AND START-UP METHOD

(71) Applicant: ZTE Corporation, Shenzhen (CN)

(72) Inventors: Jiajun Liu, Shenzhen (CN); Jihong Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 15/108,433

(22) PCT Filed: May 15, 2014

(86) PCT No.: PCT/CN2014/077614
§ 371 (c)(1),
(2) Date: Jun. 27, 2016

(87) PCT Pub. No.: WO2014/187268
PCT Pub. Date: Nov. 27, 2014

(65) Prior Publication Data
US 2016/0323827 A1    Nov. 3, 2016

(30) Foreign Application Priority Data

Dec. 25, 2013   (CN) .......................... 2013 1 0729129

(51) Int. Cl.
| | |
|---|---|
| *H04W 52/00* | (2009.01) |
| *H04W 52/02* | (2009.01) |
| *H02J 7/00* | (2006.01) |
| *H04W 88/08* | (2009.01) |

(52) U.S. Cl.
CPC ....... *H04W 52/0296* (2013.01); *H02J 7/0052* (2013.01); *H02J 2007/0095* (2013.01); *H04W 88/08* (2013.01); *Y02B 60/50* (2013.01)

(58) Field of Classification Search
CPC . H04W 52/0296; H04W 88/08; H02J 7/0052; H02J 2007/0095
See application file for complete search history.

(56) References Cited

U.S. PATENT DOCUMENTS

| | | | | |
|---|---|---|---|---|
| 2004/0124712 | A1* | 7/2004 | Yoon | H04W 52/0296 307/66 |
| 2010/0225279 | A1* | 9/2010 | Liao | H01M 2/1022 320/137 |
| 2012/0161697 | A1* | 6/2012 | Park | G06F 1/263 320/108 |

FOREIGN PATENT DOCUMENTS

| | | |
|---|---|---|
| CN | 101304568 A | 11/2008 |
| CN | 101677143 A | 3/2010 |
| CN | 102122202 A | 7/2011 |

OTHER PUBLICATIONS

International Search Report for corresponding application PCT/CN2014/077614 filed on May 15, 2014; mail date Sep. 30, 2014.

* cited by examiner

*Primary Examiner* — Ping Hsieh
(74) *Attorney, Agent, or Firm* — Cantor Colburn LLP

(57) ABSTRACT

The embodiments provide a mobile hotspot UFI device and a start-up method. The UFI device includes a battery, a main control chip, a power management chip and a start-up control unit. The power management chip internally provides a control signal at a first electric potential, and when the control signal is at a second electric potential, the power management chip controls the battery to supply electricity to hardware of the UFI device. When the main control chip does not output a GPIO signal, the start-up control unit conducts the external power supply to the control signal, so as to make the control signal change from the first electric potential to the second electric potential. When the main control chip outputs the GPIO signal, the start-up control unit disconnects the external power supply from the control signal.

10 Claims, 2 Drawing Sheets

MOBILE HOTSPOT UFI DEVICE AND START-UP METHOD

TECHNICAL FIELD

The present disclosure relates to the field of circuit control, and in particular to a mobile hotspot UFI device and a start-up method.

BACKGROUND

Currently, intelligent electronic products are multifunctional, and there are a large number of pieces of corresponding hardware accordingly. It is necessary for high-performance power management chips to control batteries to supply electricity, and these high-performance chips can fundamentally achieve two start-up modes. The first mode is a charging start-up mode. Namely, after a mobile phone is shut down, the mobile phone is actively started up when being charged. The second mode is a key start-up mode. Namely, the mobile phone is started up by means of an ON key via a delay circuit. A main function for a mobile hotspot UFI device (portable router) is to transmit a radio frequency signal, and there is only a small amount of internal hardware in the mobile hotspot UFI device, therefore the mobile hotspot UFI device does not need to be controlled by a high-performance power management chip. In order to save cost, the UFI device is generally provided with a cheap power management chip. Namely, the power management chip can identify a control signal at only one electric potential, which is only used for realizing the key start-up. However, in order to improve the competitiveness of the UFI device, how to realize the charging start-up by means of a control signal at one electric potential without influence on key start-up is a technical problem needing to be solved.

In addition, it is important to note that the start-up of an electronic device is determined according to judgement on whether a main control chip works, instead of judgement on whether a battery supplies power.

SUMMARY

In order to solve the technical problems existing currently, the embodiments of the present disclosure provide a mobile hotspot UFI device and a start-up method.

An embodiment of the present disclosure provides a mobile hotspot UFI device, which may include a battery, a main control chip and a power management chip. The power management chip may internally provide a control signal at a first electric potential, and when the control signal is at a second electric potential, the power management chip may control the battery to supply electricity to hardware of the UFI device, the hardware getting the electricity from the battery includes, at least, the main control chip. The UFI device may further include:

a start-up control unit, wherein an input end of the start-up control unit is connected to an external power supply which charges the battery, an output end of the start-up control unit is connected to the control signal, and a control end of the start-up control unit is connected to a General Purpose Input Output (GPIO) signal output by the main control chip. When the main control chip does not output the GPIO signal, the start-up control unit may conduct the external power supply to the control signal, so as to make the control signal change from the first electric potential to the second electric potential. When the main control chip outputs the GPIO signal, the start-up control unit may disconnect the external power supply from the control signal.

Another embodiment of the present disclosure provides a start-up method for a mobile hotspot UFI device, which may include that:

when an external power supply charges a battery of a UFI device, it is detected whether a main control chip of the UFI device outputs a GPIO signal;

when the main control chip does not output the GPIO signal, the external power supply is conducted to a control signal of a power management chip of the UFI device, so as to make the control signal change from a first electric potential to a second electric potential, to enable the power management chip to control the battery to supply electricity, wherein hardware getting the electricity from the battery includes, at least, the main control chip; and when the main control chip outputs the GPIO signal, the external power supply is disconnected from the control signal, so as to make the control signal be recovered from the second electric potential to the first electric potential.

The solutions in the embodiments of the present disclosure have the beneficial effects as follows.

The start-up control unit in the embodiments of the present disclosure can judge whether the UFI device is started up according to the GPIO signal output by the main control chip of the UFI device. Namely, when the UFI device is in a shutdown state, the main control chip does not output the GPIO signal since the main control chip is not working. If an external power supply charges the battery at this time, the power management chip is driven by utilizing the external power supply, such that the power management chip controls the battery to supply electricity to the hardware of the UFI device, the main control chip being included therein. After the main control chip obtains the electricity, the UFI device is started up, the main control chip begins to output the GPIO signal, the start-up control unit stops the external power supply and changes the electric potential of the control signal according to the GPIO signal, and therefore the control signal is recovered to the first electric potential. Namely, the power management chip is reset to a standby state, thereby ensuring that the power management chip can be controlled by an ON/OFF key thereafter. As the ON/OFF key of the UFI device can drive the power management chip by utilizing the control signal at the second electric potential for making the power management chip control the battery to supply electricity, so that the UFI device in the embodiments of the present disclosure can adopt a cheap power management chip capable of identifying only one electric potential signal, thereby saving cost of the UFI device.

DETAILED DESCRIPTION OF THE EMBODIMENTS

In order to make the technical problems to be solved by the embodiments of the present disclosure, the technical solutions and the advantages clearer, the present disclosure is described below with reference to the drawings and the embodiments in detail.

By means of a start-up control method for a mobile hotspot UFI device provided by an embodiment of the present disclosure, a charging start-up function can be realized by utilizing a chip with simple functions and low cost, and does not conflict with an ON/OFF key of the UFI device.

Figure 1:
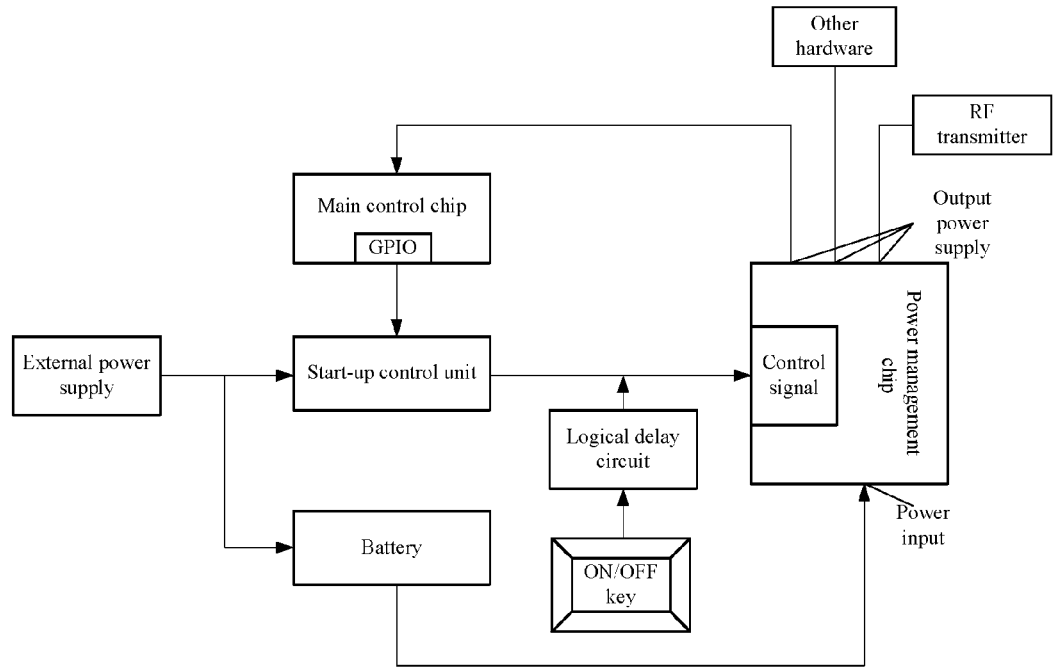
FIG. 1 is a structural diagram of a UFI device according to an embodiment of the present disclosure.

As shown in FIG. 1, a mobile hotspot UFI device includes a battery, a main control chip and a power management chip. The power management chip internally provides a control signal at a first electric potential, and when the control signal is at a second electric potential, the power management chip controls the battery to supply electricity to hardware of the UFI device. The hardware getting the electricity from the battery includes, at least, the main control chip. The UFI device further includes:

a start-up control unit, and an input end of the start-up control unit is connected to an external power supply which charges the battery, an output end of the start-up control unit is connected to the control signal, and a control end of the start-up control unit is connected to a General Purpose Input/Output (GPIO) signal output by the main control chip. When the main control chip does not output the GPIO signal, the start-up control unit conducts the external power supply to the control signal, so as to make the control signal change from the first electric potential to the second electric potential. When the main control chip outputs the GPIO signal, the start-up control unit disconnects the external power supply from the control signal.

The start-up control unit in the embodiment of the present disclosure can judge whether the UFI device is started up or not according to the GPIO signal output by the main control chip of the UFI device. Namely, when the UFI device is in a shutdown state, the main control chip does not output the GPIO signal since the main control chip is not working. If an external power supply charges the battery at this time, the power management chip is driven by utilizing the external power supply, such that the power management chip controls the battery to supply electricity to the hardware of the UFI device, the main control chip being included therein. The main control chip finishes starting-up of the UFI device after getting the electricity, and further begins to output the GPIO signal. The start-up control unit stops the external power supply and changes the electric potential of the control signal according to the GPIO signal, and therefore the control signal is recovered to the first electric potential. Namely, the power management chip is reset to a standby state, thereby ensuring that the power management chip can be controlled by an ON/OFF key thereafter. As the ON/OFF key of the UFI device can drive the power management chip by utilizing the control signal at the second electric potential for making the power management chip control the battery to supply electricity, so that the UFI device in the embodiment of the present disclosure can adopt a cheap power management chip capable of identifying only one electric potential signal, thereby saving cost of the UFI device.

Specifically, since the UFI device serves as a hotspot, it should include a radio frequency transmitter (as shown in FIG. 1). In a normal working process (that is, a transmission process of a radio frequency signal), a user can judge the electric quantity of the battery by a screen display, a signal lamp or other modes (the screen and the signal lamp are not shown in FIG. 1). After the UFI device is shut down due to the fact that the battery is out of power, the user often wants to observe the charged electric quantity of the UFI device when the user charges the UFI device. However, with reference to the application characteristics of the UFI device, during charging, a vast majority of users do not require the radio frequency transmitter of the UFI device to work, namely, to provide wireless network. As the UFI device itself is a portable mobile hotspot, if it is necessary for the hotspot to provide wireless network nearby a charging position, a fixed router can meet requirements absolutely. Thus, in addition to the main control chip, objects to which the battery supplies power (also referred to as power supply objects) under a condition of charging start-up may further preferably include: hardware capable of prompting electric quantity, and the radio frequency transmitter may not be taken as an object to which power is supplied (also referred to as power supply object) under a condition of charging start-up. Compared with the power supply objects under a condition of charging start-up, power supply objects under a condition of key start-up may further include the radio frequency transmitter in addition to the main control chip.

It is important to note that the power supply objects may be determined according to a usage environment of the UFI device. In addition, the power supply objects under a condition of charging start-up and the power supply objects under a condition of key start-up may be determined according to factors such as hardware, functions and power consumption in the UFI device. The embodiments of the present disclosure are intended to provide a UFI device capable of realizing different power supply modes (hardware power supply corresponding to key start-up and hardware power supply corresponding to charging start-up) by utilizing a control signal at one electric potential rather than a method for determining power supply objects. Thus, when a specific realizing mode is introduced below, the type of real hardware included in the power supply objects is not described.

Also as shown in FIG. 1, the UFI device in the embodiment of the present disclosure may further include:

an ON/OFF key, and when the ON/OFF key is pressed, the control signal is made to change from the first electric potential to the second electric potential. As a publically-known technology in the field, the ON/OFF key is connected to the control signal via a logical delay circuit. Therefore, the control signal would complete the change from the first electric potential to the second electric potential gradually after a certain time period from the time point at which the ON/OFF key is pressed.

The power management chip may specifically include:

a detection unit, configured to detect a time duration for the control signal to change from the first electric potential to the second electric potential, and generate a detection result;

a storage unit, configured to record a first control instruction corresponding to a first time range and a second control instruction corresponding to a second time range. A time duration for the control signal to change from the first electric potential to the second electric potential by means of an external power supply falls within the first time range, and a time duration for the control signal to change from the first electric potential to the second electric potential by means of the ON/OFF key falls within the second time range, the first time range and the second time range are not intersected with each other. The first control instruction is configured to enable the battery to supply electricity to one or more first pre-set power supply objects, and the second control instruction is configured to enable the battery to supply electricity to one or more second pre-set power supply objects. The one or more first pre-set power supply objects and the one or more second pre-set power supply objects belong to hardware in the UFI device and include, at least, the main control unit;

a determination unit, configured to determine whether the detection result falls within the first time range or the second time range, and generate a determination result; and an execution unit, configured to execute the first control instruction or the second control instruction according to the determination result.

It is important to note that in order to facilitate descriptions, the power management chip is divided to all units in function to be described. Certainly, when the embodiment of the present disclosure is implemented, the functions of all the units may be achieved in one or more pieces of software.

In the embodiment, the power supply objects are able to be adjusted by changing the control instructions inside the storage unit.

Figure 2:
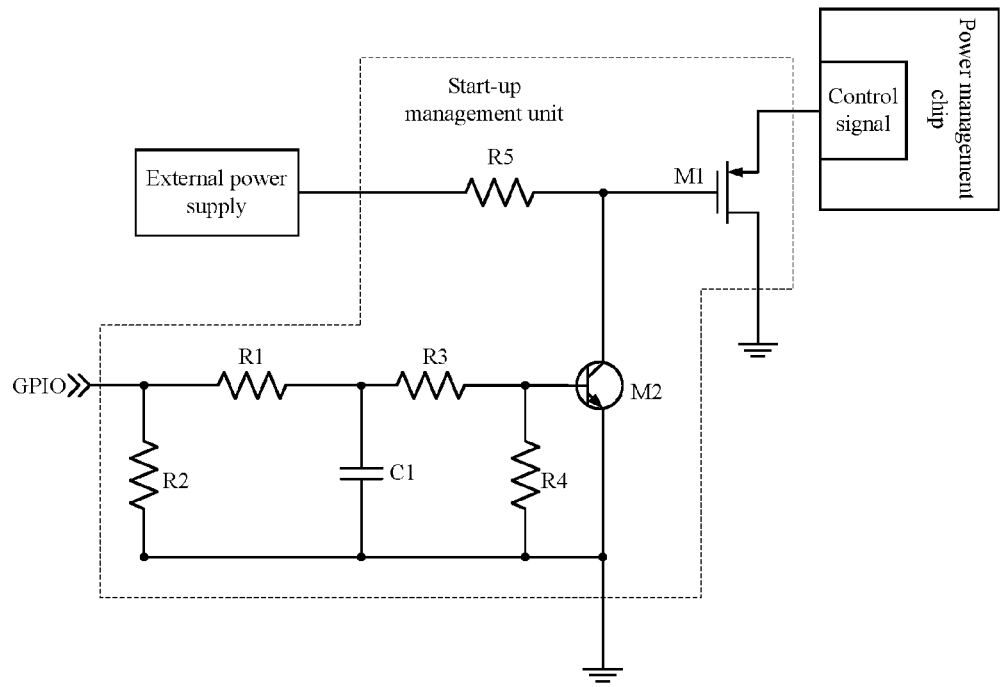
FIG. 2 is a structural diagram of a start-up control unit according to an embodiment of the present disclosure.

As shown in FIG. 2, the start-up control unit may be composed of a Metal Oxide Semiconductor (MOS) tube M1 and a triode M2. A gate of the M1 is connected to the external power supply and a collector of the M2 respectively, a drain of the M1 is grounded, and a source of the M1 is connected to the control signal. An emitter of the M2 is grounded, and a base of the M2 is connected to a GPIO signal of the main control chip and configured to access the control signal.

The external power supply enables the M1 to be conducted so as to pull the control signal down from the first electric potential to the second electric potential, and the GPIO signal enables the M2 to be conducted and enables the M1 to be cut off, so that the control signal is maintained at the first electric potential in a standby state.

Figure 3:
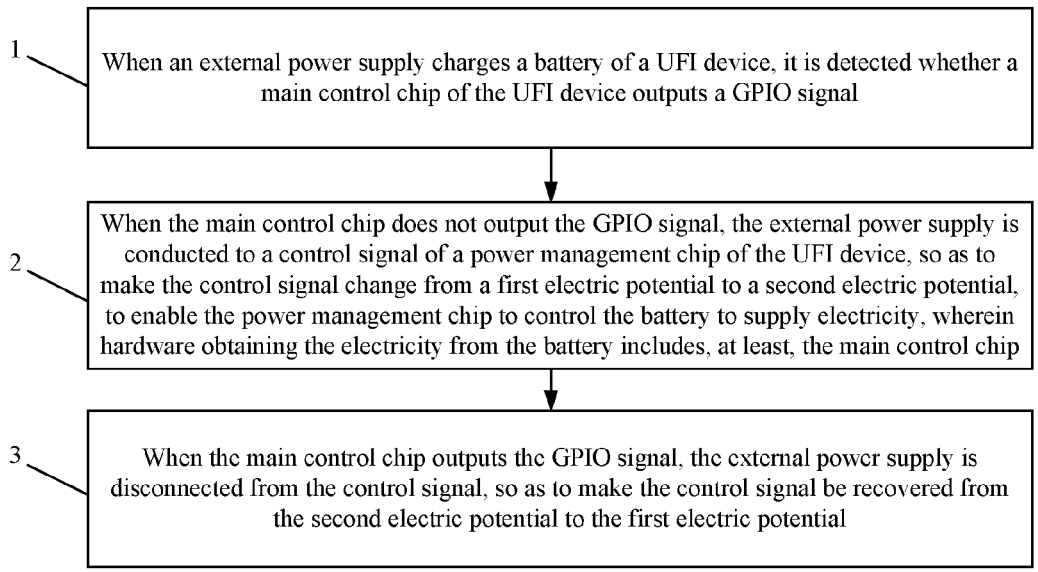
FIG. 3 is a step diagram of a start-up method for a UFI device according to an embodiment of the present disclosure.

The start-up control unit shown in FIG. 3 is described below with reference to FIG. 1 in detail.

The control signal is maintained at the first electric potential by the power management chip under usual situations.

<Scene 1> If the external power supply is connected and the control chip outputs the GPIO signal, it represents that the UFI device has been in an ON state (namely, the main control chip works and outputs the GPIO signal), the GPIO signal conducts the M2 at this time to make a collector of the M2 be low, so that the M1 is cut off, the control signal is still at the first electric potential, and the UFI device is still kept in the ON state.

<Scene 2> If the external power supply is connected and the control chip does not output the GPIO signal, it represents that the UFI device has been in an OFF state, the external power supply directly conducts the M1 at this time, and the control signal is pulled down from the first electric potential to the second electric potential. The power management chip recognizes a key start-up by detecting a time duration for the control signal to change from the first electric potential to the second electric potential, and starts to execute a charging start-up flow (namely the above first control instruction) to control the battery to supply electricity to one or more first pre-set power supply objects.

<Scene 3> If it is not detected that the external power supply is connected, the control chip changes from the first electric potential to the second electric potential when an ON/OFF key is pressed. The power management chip recognizes a key start-up by detecting a time duration for the control signal to change from the first electric potential to the second electric potential, and executes a key start-up flow (namely the above second control instruction) to control the battery to supply electricity to one or more second pre-set power supply objects. After start-up, the main control chip outputs the GPIO signal. When the key is loosened, the control signal is re-pulled up, and the current state is consistent with <Scene 1>.

The functions which can be realized in the <Scene 1>, the <Scene 2> and the <Scene 3> are introduced below with reference to an embodiment.

Suppose the UFI device in the embodiment of the present disclosure has a display screen, the first power supply objects during charging start-up are the main control chip and the display screen, and the second power supply objects during key start-up are the main control chip, the display screen and the radio frequency transmitter. The external power supply accesses for charging the UFI device when the UFI device is out of power, the UFI device executes charging start-up, and the main control chip and the display screen obtain electricity at this time. The main control chip controls the display screen to display the current electric quantity of the UFI device. Thereafter, if a user presses an ON key, the UFI device executes key start-up, and the radio frequency transmitter obtains electricity at this time and begins to transmit a radio frequency signal. Certainly, after the user presses the ON/OFF key again, the UFI device is shut down (the shutdown of the UFI device via the ON/OFF key falls within the traditional art). Thereafter, in a charging state, the main control chip stops outputting the GPIO signal, such that the UFI device re-executes charging start-up. Namely, in a charging start-up state, the UFI device does not transmit the radio frequency signal. However, the current electric quantity of the battery can be displayed.

As the GPIO signal output by the main control chip enables the M2 to be conducted and enables the M1 to be cut off to further cause the control signal to be at the first electric potential, in a process that the UFI device is shut down, influence on the power management chip caused by instable output of the main control chip should be avoided as far as possible. Namely, in the process that the UFI device is shut down, the GPIO signal generates a pulse to make the voltage of the control signal recovered to the first electric potential, thereby causing shutdown failure. In order to avoid such a situation, the start-up control unit may further specifically include: a filter circuit, configured to filter the pulse of the control signal.

Specifically, the filter circuit may specifically include: a resistor R1 and a capacitor C1, wherein the R1 is connected between the base of the M2 and the GPIO signal; and one end of the C1 is connected between the R1 and the base of the M2, and the other end of the C1 is grounded. The R1 and the C1 realize an RC filter function.

Certainly, on the basis of the above embodiment, a voltage division circuit may be added to the start-up control unit and may be configured to further reduce a pulse crest of the GPIO signal. The voltage division circuit may specifically include: resistors R2, R3 and R4, wherein one end of the R2 is connected between the R1 and the GPIO signal, and the other end of the R2 is grounded; the R3 is connected between the R1 and the base of the M2; and one end of the R4 is connected between the R3 and the base of the M2, and the other end of the R4 is grounded.

In addition, in specific circuit realization, a resistor R5 may be added. The R5 is configured to perform voltage reduction on the external power supply, so that the external power supply can meet a usage standard of the UFI device.

To sum up, the UFI device in the embodiment of the present disclosure enables the power management chip which identifies only one electric potential (namely the second electric potential of the control signal in the embodiment of the present disclosure) to complete a charging start-up function and a key start-up function by means of a start-up control unit having a simple passive structure. Thus, manufacturing cost of the UFI device is greatly saved.

In addition, as shown in FIG. 3, another embodiment of the present disclosure also provides a start-up method for a mobile hotspot UFI device. The start-up control method includes the steps as follows.

Step 1: When an external power supply charges a battery of a UFI device, it is detected whether a main control chip of the UFI device outputs a GPIO signal.

Step 2: When the main control chip does not output the GPIO signal, the external power supply is conducted to a control signal of a power management chip of the UFI device, so as to make the control signal change from a first electric potential to a second electric potential, to enable the power management chip to control the battery to supply electricity, wherein hardware getting the electricity from the battery includes, at least, the main control chip.

Step 3: When the main control chip outputs the GPIO signal, the external power supply is disconnected from the control signal, so as to make the control signal be recovered from the second electric potential to the first electric potential.

Obviously, the start-up method in the embodiment corresponds to the UFI device in the embodiment of the present disclosure, and the method and the UFI device can achieve the same technical effect.

The above is only preferred implementation modes of the present disclosure. It should be pointed out that those skilled in the art can also make some improvements and modifications without departing from the principle of the present disclosure. These improvements and modifications shall fall within the protection scope of the present disclosure.

What is claimed is:

1. A mobile hotspot UFI device, comprising a battery, a main control chip and a power management chip, wherein the power management chip internally provides a control signal at a first electric potential, and when the control signal is at a second electric potential, the power management chip controls the battery to supply electricity to hardware of the UFI device, the hardware getting the electricity from the battery comprises, at least, the main control chip; the UFI device further comprising:
   a start-up control unit, and an input end of the start-up control unit is connected to an external power supply which charges the battery, an output end of the start-up control unit is connected to the control signal, and a control end of the start-up control unit is connected to a General Purpose Input Output (GPIO) signal output by the main control chip; when the main control chip does not output the GPIO signal, the start-up control unit conducts the external power supply to the control signal, so as to make the control signal change from the first electric potential to the second electric potential; and when the main control chip outputs the GPIO signal, the start-up control unit disconnects the external power supply from the control signal.

2. The UFI device as claimed in claim 1, further comprising: an ON/OFF key, wherein when the ON/OFF key is pressed, the control signal is made to change from the first electric potential to the second electric potential; and
   the power management chip comprises:
   a detection unit, configured to detect a time duration for the control signal to change from the first electric potential to the second electric potential, and generate a detection result;

a storage unit, configured to record a first control instruction corresponding to a first time range and a second control instruction corresponding to a second time range, wherein a time duration for the control signal to change from the first electric potential to the second electric potential by means of an external power supply falls within the first time range, a time duration for the control signal to change from the first electric potential to the second electric potential by means of the ON/OFF key falls within the second time range, and the first time range and the second time range are not intersected with each other, the first control instruction is configured to enable the battery to supply electricity to one or more first pre-set power supply objects, the second control instruction is configured to enable the battery to supply electricity to one or more second pre-set power supply objects, and the one or more first pre-set power supply objects and the one or more second pre-set power supply objects belong to hardware in the UFI device and comprise, at least, the main control unit;

a determination unit, configured to determine whether the detection result falls within the first time range or the second time range and generate a determination result; and an execution unit, configured to execute the first control instruction or the second control instruction according to the determination result.

3. The UFI device as claimed in claim 2, wherein the start-up control unit comprises:
   a Metal Oxide Semiconductor (MOS) tube M1 and a triode M2, wherein a gate of the M1 is connected to the external power supply and a collector of the M2 respectively, a drain of the M1 is grounded, a source of the M1 is connected to the control signal, an emitter of the M2 is grounded, and a base of the M2 is connected to the GPIO signal of the main control chip and configured to access the control signal,
   wherein the external power supply enables the M1 to be conducted so as to pull the control signal down from the first electric potential to the second electric potential, and the GPIO signal enables the M2 to be conducted and enables the M1 to be cut off, so that the control signal is maintained at the first electric potential.

4. The UFI device as claimed in claim 3, wherein the start-up control unit further comprises: a filter circuit, configured to filter a pulse of the control signal.

5. The UFI device as claimed in claim 4, wherein the filter circuit comprises: a resistor R1 and a capacitor C1, wherein the R1 is connected between the base of the M2 and the GPIO signal, one end of the C1 is connected between the R1 and the base of the M2, and the other end of the C1 is grounded.

6. The UFI device as claimed in claim 5, wherein the start-up control unit further comprises: a voltage division circuit which comprises: resistors R2, R3 and R4,
   wherein one end of the R2 is connected between the R1 and the GPIO signal, the other end of the R2 is grounded, the R3 is connected between the R1 and the base of the M2, one end of the R4 is connected between the R3 and the base of the M2, and the other end of the R4 is grounded.

7. The UFI device as claimed in claim 2, wherein the one or more first pre-set power supply objects and the one or more second pre-set power supply objects are determined according to a usage environment of the UFI device.

8. The UFI device as claimed in claim 7, wherein the one or more first pre-set power supply objects and the one or more second pre-set power supply objects are determined further according to hardware, functions and power consumption in the UFI device.

9. The UFI device as claimed in claim 2, wherein the one or more first pre-set power supply objects further comprise hardware capable of prompting electric quantity; and the one or more second pre-set power supply objects further comprise a radio frequency transmitter.

10. A start-up method for a mobile hotspot UFI device, comprising:
   when an external power supply charges a battery of the UFI device, detecting whether a main control chip of the UFI device outputs a General Purpose Input Output (GPIO) signal;
   when the main control chip does not output the GPIO signal, conducting the external power supply to a control signal of a power management chip of the UFI device, so as to make the control signal change from a first electric potential to a second electric potential, to enable the power management chip to control the battery to supply electricity, wherein hardware getting the electricity from the battery comprises, at least, the main control chip; and
   when the main control chip outputs the GPIO signal, stopping conducting the external power supply to the control signal, so as to make the control signal be recovered from the second electric potential to the first electric potential.

* * * * *